United States Patent [19]
Chia

[11] Patent Number: 5,651,085
[45] Date of Patent: Jul. 22, 1997

[54] ALL FIBER ATTENUATOR

[76] Inventor: Shin-Lo Chia, 1875 Montford Ct., San Jose, Calif. 95132

[21] Appl. No.: 313,648

[22] Filed: Sep. 27, 1994

[51] Int. Cl.⁶ ........................................ G02B 6/38
[52] U.S. Cl. .................... 385/140; 385/142; 385/96; 385/99
[58] Field of Search ................... 385/95, 96, 99, 385/140, 142

[56] References Cited

U.S. PATENT DOCUMENTS

| | | | |
|---|---|---|---|
| 4,529,262 | 7/1985 | Ashkin et al. | 350/96.15 |
| 4,639,078 | 1/1987 | Sheem | 350/96.21 |
| 4,728,170 | 3/1988 | Robertson | 385/140 |
| 4,799,946 | 1/1989 | Ainslie et al. | 65/3.12 |
| 4,881,793 | 11/1989 | Tarbox | 385/140 |
| 4,884,859 | 12/1989 | Yamamoto et al. | 350/96.15 |
| 4,925,514 | 5/1990 | Okada et al. | 156/249 |
| 5,095,519 | 3/1992 | Dorsey | 385/140 |
| 5,113,476 | 5/1992 | Okada et al. | 385/140 |
| 5,198,270 | 3/1993 | Andrejco et al. | 427/230 |
| 5,236,481 | 8/1993 | Berkey | 65/3.11 |
| 5,274,734 | 12/1993 | Jin et al. | 385/142 |
| 5,363,234 | 11/1994 | Newhouse et al. | 372/6 |

FOREIGN PATENT DOCUMENTS

| | | | |
|---|---|---|---|
| 57-4006 | 1/1982 | Japan | 385/140 |
| 62-275203 | 11/1987 | Japan | 385/140 |
| 5-88022 | 4/1993 | Japan | 385/140 |

OTHER PUBLICATIONS

Richard P. Tumminelli, et al. Fabrication of High–Concentration Rare–EArth Doped Optical Fibers Using Chelates. Journal of Lightwave Technology, vol. 8, No. 11, Nov. 1990. pp. 1680–1683.

*Primary Examiner*—John Ngo

[57] ABSTRACT

An optical attenuator uses a segment of attenuating fiber interposed in the optical path. The attenuating fiber is produced by using a solution doping technique to introduce transition or rare earth elements into the fiber's core. The dopant reduces the transmission of the fiber. The degree of attenuation depends upon the material used as the dopant, the dopant level, and the length of the attenuation segment. In a specific embodiment, an optical attenuator is provided having a first and second signal carrying optical fibers and an attenuating fiber segment, each of which has a core, a cladding substantially coaxial with the core, and a substantially planar endface. The attenuating fiber segment is fusion spliced between the first and second signal carrying optical fibers. In a second embodiment a portion of the cladding of the attenuating fiber is chemically etched.

7 Claims, 2 Drawing Sheets

ALL FIBER ATTENUATOR

BACKGROUND OF THE INVENTION

The present invention relates generally to fiber optic devices. Specifically, the present invention relates to an all fiber attenuator.

Although a primary virtue of optical fibers as communication media is the low loss of the fibers, there are instances where it is necessary to provide attenuation in the optical path. A variety of methods have been disclosed to fabricate optical fiber attenuators.

In U.S. Pat. No. 4,639,078 the end of a fiber is coated with a thin layer of an adhesive liquid containing submicron light absorbing particles. The liquid is spread evenly over the end of the fiber before it is cured. After solidification the coated end of the fiber is spliced to the end of a second fiber.

In U.S. Pat. No. 5,095,519 a section of coreless, undoped fiber is fusion spliced into an optical fiber transmission path, both fibers being of the same diameter. Upon encountering the insert the beam diameter expands to a pre-selected diameter at the end of the insert. The ratio of the beam diameter at the end of the insert to the diameter of the adjacent fiber end determines the degree of attenuation.

In U.S. Pat. No. 4,884,859 an optical attenuation segment within a fiber is created by forming fine cracks in the attenuating segment. The cracks are formed by heating a segment of the fiber and simultaneously applying tension to that segment.

In U.S. Pat. No. 4,529,262 a birefringent polarization-preserving fiber and a single polarization fiber are combined. The polarization-preserving fiber acts as a variable wave plate and the single-polarization fiber acts as a polarizer. The degree of attenuation can be modified by exposing the fiber to tension, pressure, or temperature, thereby altering the birefringence in the polarization-preserving fiber.

In U.S. Pat. No. 4,881,793 an attenuating fiber segment is spliced into a signal carrying fiber. The attenuating segment is formed by vapor doping a length of fiber and then cutting the fiber to an appropriate length to achieve the desired level of attenuation.

The above attenuators suffer from a number of performance disadvantages. For example, in the '859 patent the number and size of the cracks regulate the degree of attenuation, two factors which are difficult to precisely control. A second problem can be the environmental stability of the attenuator. In particular, the cracks in the '859 fibers and the polarization of the '262 polarization-preserving fibers are environmentally sensitive, thus increasing the costs associated with these attenuators as well as limiting their possible applications. Wavelength and polarization sensitivities of some of attenuators adds even further limitations to their use.

From the foregoing, it is apparent that an optical attenuator is desired which may be inexpensively produced and which may provide a precise attenuation of light energy over a broad range, and for different configurations.

SUMMARY OF THE INVENTION

The present invention provides an optical attenuator which is capable of being fabricated to provide any desired level of attenuation within a wide range of levels, and which is characterized by a high level of wavelength insensitivity.

In brief, an optical attenuator according to the present invention uses a segment of attenuating fiber interposed in the optical path. The attenuating fiber is produced by using a solution doping technique to introduce transition or rare earth elements into the fiber's core. The dopant reduces the transmission of the fiber by an amount that depends upon the material used as the dopant, the dopant level, and the length of the attenuation segment.

In a specific embodiment, an optical attenuator for in-line use comprises first and second signal-carrying optical fibers and an attenuating fiber segment, each of which has a core with a substantially coaxial cladding. Each of the first and second fibers is formed with at least one substantially planar endface. The attenuating fiber segment has both endfaces substantially flat. Prior to assembly the attenuating fiber segment is doped to provide a given level of attenuation. The attenuating fiber segment is then fusion spliced between the first and second signal carrying optical fibers.

In a second embodiment, the attenuator includes two ferrule assemblies. Within each ferrule assembly an optical fiber and one portion of an attenuating fiber are held in a fixed relationship such that the endfaces of the optical fiber and the attenuating fiber are in close optical proximity to one another and the fibers are substantially collinear. The two assemblies are held in a fixed relationship with respect to each other with an appropriately sized sleeve.

A further understanding of the nature and advantages of the present invention may be realized by reference to the remaining portions of the specification and the drawings.

DESCRIPTION OF THE PREFERRED EMBODIMENT

Figure 1:
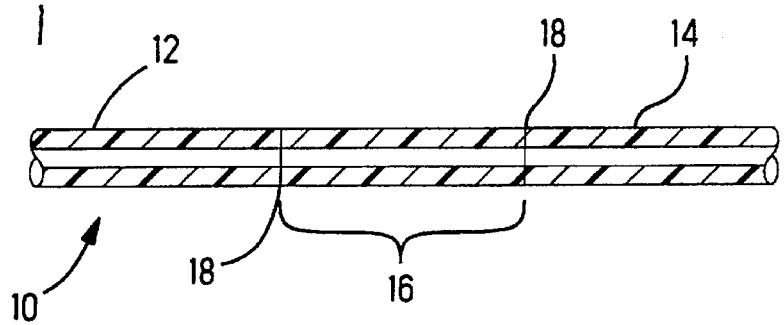
FIG. 1 is a representation of an optical attenuator assembly according to a particular embodiment of the present invention.

FIG. 1 is a representation of the operative portion of an optical attenuator 10 designed according to an embodiment of the present invention. Attenuator 10 includes a first single-mode optical fiber 12 and a second single-mode optical fiber 14. Fusion spliced between fibers 12 and 14 is an attenuating optical fiber 16. The fusion splices are shown at points 18. In the preferred embodiment fibers 12, 14, and 16 each have a core and a cladding substantially coaxial with the core. Further, they are each of approximately equal diameter. The adjacent endfaces of fibers 12, 14, and 16 are substantially parallel and are spliced such that the core axes of the fibers are substantially collinear.

Attenuating fiber 16 is formed by solution doping a segment of optical fiber. The segment is preferably doped with either a rare earth or transition metal element. The level of attenuation is directly proportional to both dopant concentration and fiber segment length.

Vapor doping is the traditional method of incorporating dopants into optical fibers. As noted in the '793 patent discussed above, there are several different vapor deposition techniques including modified chemical vapor deposition (MCVD), outside vapor deposition (OVD), and vapor axial deposition (VAD). These techniques are used to form a thick rod called a precursor, the precursor having a suitable compositional cross section. After the precursor is formed it is drawn into a fiber with the desired composition gradients.

Solution doping offers an alternative approach to introducing a dopant into an optical fiber. This technique allows much higher dopant concentrations to be achieved, especially with rare earths which are difficult to utilize in the vapor deposition techniques preferably cobalt is used as a dopant. This technique can also be used to introduce transition metals, such as cobalt, into the optical fiber. U.S. Pat. No. 4,799,946, incorporated herein by reference, discloses doping optical fibers using this method.

Figure 2:
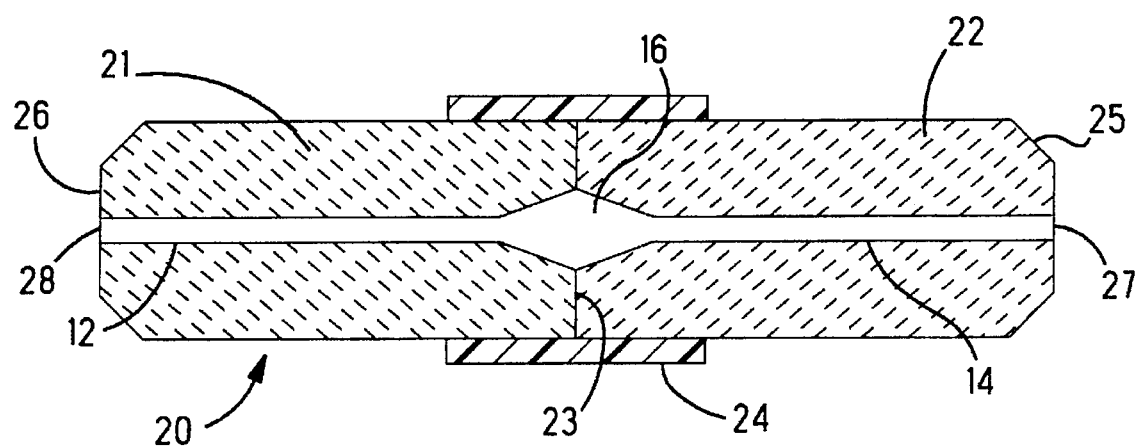
FIG. 2 is a representation of a ferrule assembly employed by a particular embodiment of the present invention.
Figure 3:
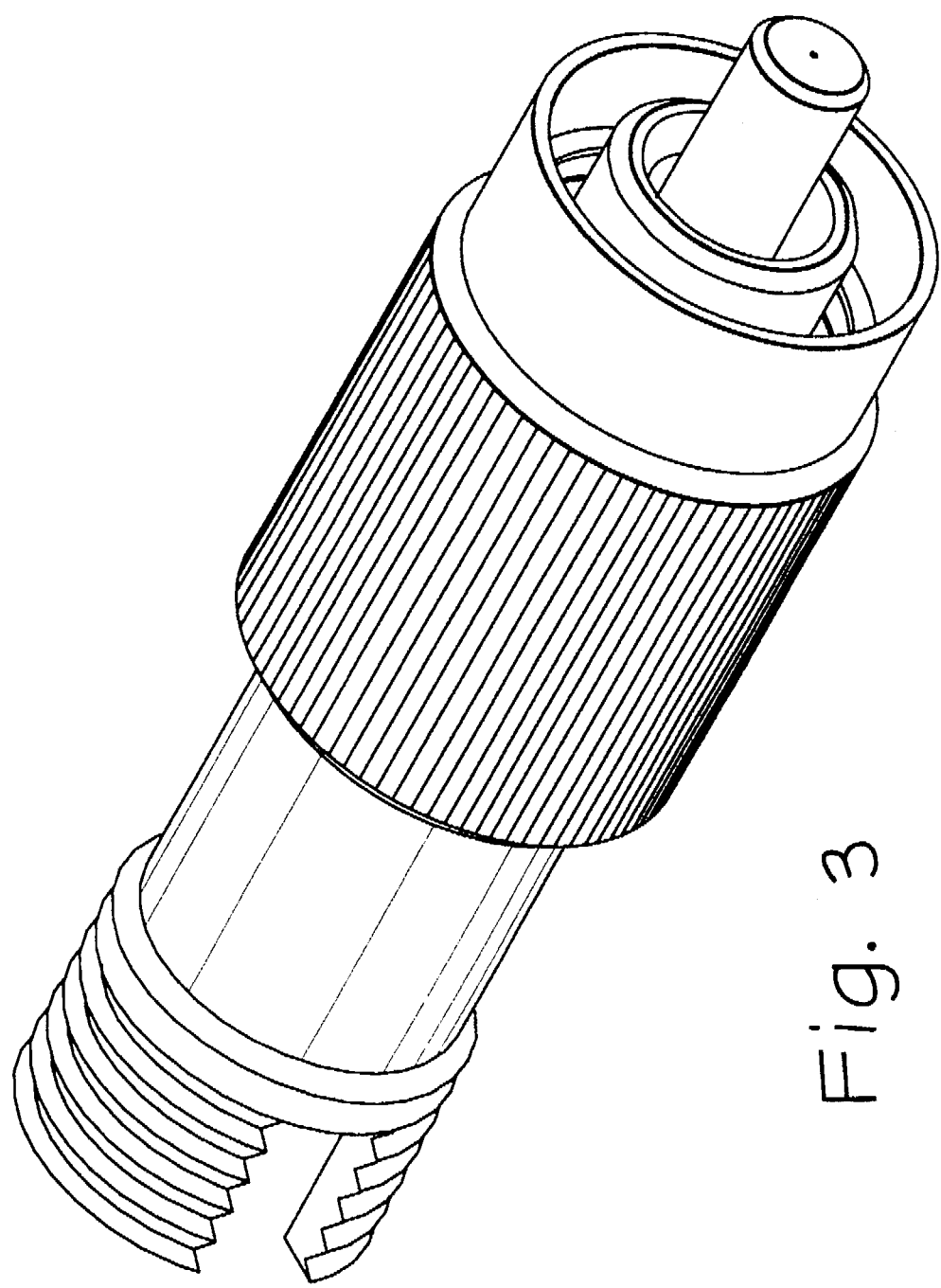
FIG. 3 shows the present invention packaged for use with industry standard FC type optical fiber connectors.

FIG. 2 illustrates the all fiber attenuator in an assembly 20. Assembly 20 includes two ferrule assemblies 21 and 22 having central bores which contain optical fibers 12 and 14, respectively. Attenuating fiber segment 16 is located between fibers 12 and 14. The adjoining fiber endfaces for fiber pairs 12/16 and 14/16 may either be placed in substantial optical contact with one another or fusion spliced prior to assembly within assembly 20. Ferrule assemblies 21 and 22 are held together in a fixed relationship at an interface 23 inside an alignment sleeve 24, assembly 20 having mating faces 25 and 26 for optically mating fiber endfaces 27 and 28 to other optical assemblies (not shown). Sleeve 24 may be a split sleeve exerting radial pressure on both ferrules, thereby centering and aligning them. The assembly can be inserted into a variety of package formats such as SC, ST, or FC type connectors. FIG. 3 shows the assembly packaged for use with an industry standard FC type optical fiber connectors.

Optical fibers 12 and 14 may be either single-mode or multi-mode fibers. A single-mode fiber typically has a core diameter of 8.3–10 μm, a cladding diameter of 125 μm, and a buffer diameter of 250, 500, or 900 μm. Single-mode fibers typically operate at wavelengths between 1200 and 1600 nm. Multi-mode fibers with cladding diameters of 125 μm are available with core diameters of 50, 62, and 100 μm. Multi-mode fibers are also available with a core diameter of 100 μm and a cladding diameter of 140 μm. Multi-mode fibers typically operate at wavelengths between 700 and 1600 nm.

Figure 4:
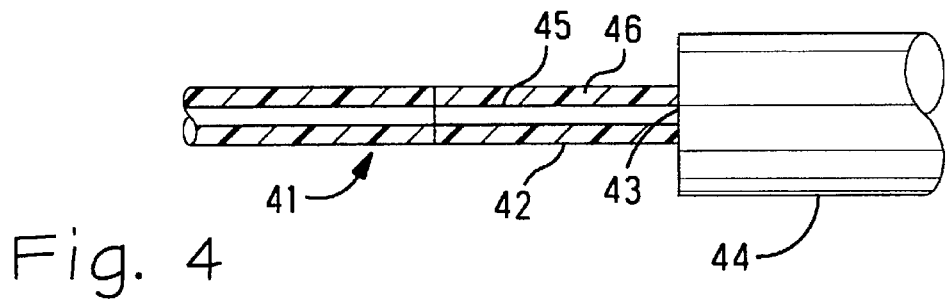
FIG. 4 illustrates an all fiber attenuator coupled directly to a detector.
Figure 5:
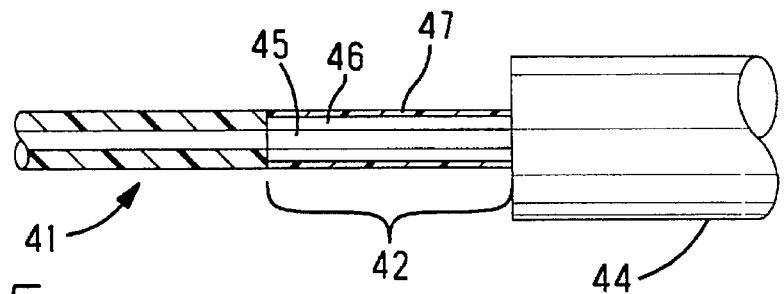
FIG. 5 illustrates an all fiber attenuator as shown in FIG. 4 with the attenuating fiber having an etched outer cladding.

FIGS. 4–5 illustrate a second embodiment of the invention in which the all fiber attenuator is coupled directly into a detector. In FIG. 4 a single-mode optical fiber 41 is fusion spliced to an attenuating optical fiber 42. Attenuation, as in the above embodiment, is provided by solution doping a segment of an optical fiber. Attenuating fiber 42 is placed such that its endface 43 is in substantial optical contact with a detector 44. In this configuration light which is not absorbed by the dopant will instead be scattered out of a core portion 45 and into a cladding portion 46 of attenuating fiber 42. If left untreated this light can enter detector 44, thus decreasing the level of attenuation provided by attenuating fiber 42. This effect can be reduced by etching the cladding portion of the fiber as shown in FIG. 5. In this figure a cladding portion 47 of attenuating fiber 42 has been chemically etched thereafter, the cladding is coated with a layer of epoxy. In this instance most of the light which has been scattered into cladding portion 47 will not be reflected by the etched and roughened fiber walls. Instead this light will be leaked out of the fiber, thus not reaching the detector and not significantly affecting the performance of the fiber attenuator. A coating, such as epoxy, can be applied to the chemically etched cladding, the coating absorbing light leaking out of cladding portion 47.

While the invention has been particularly shown and described with reference to specific embodiments thereof, it will be understood by those skilled in the art that the foregoing and other changes in the form and details may be made therein without departing from the spirit or scope of the invention.

I claim:

1. An optical attenuator, comprising:

first and second optical fibers, each of said first and second optical fibers including a core, a cladding substantially coaxial with the core, and a substantially planar endface;

a third optical fiber interposed between said first and second optical fibers, said third optical fiber including a doped core, wherein said dopant is introduced by a solution doping technique, a cladding substantially coaxial with the doped core, and first and second substantially planar endfaces abutting said planar endfaces of said first and second fibers, respectively; and wherein said cladding of said third optical fiber is chemically etched, and wherein said chemically etched cladding is coated with a layer of epoxy.

2. An optical attenuator, comprising:

first and second optical fibers, each of said first and second optical fibers including a core, a cladding substantially coaxial with the core, and a substantially planar endface;

a third optical fiber interposed between said first and second optical fibers, said third optical fiber including a solution doped core, a cladding substantially coaxial with the doped core, and first and second substantially planar endfaces abutting said planar endfaces of said first and second fibers, respectively; and wherein said dopant is chosen from the group consisting of transition metal elements and rare earth elements.

3. The optical attenuator of claim 2, wherein said transition metal is cobalt.

4. A method of fabricating an optical attenuator, comprising the steps of:

providing first, second, and third optical fibers, each fiber characterized by a core and a cladding coaxial with said core;

solution doping said third optical fiber with a material from the group consisting of transition metals and rare earth elements;

fusion splicing a first endface of said third optical fiber to an endface of said first optical fiber; and fusion splicing a second endface of said third optical fiber to an endface of said second optical fiber.

5. A method of fabricating an optical attenuator, comprising the steps of:

providing first, second, and third optical fibers, each fiber characterized by a core and a cladding coaxial with said core;

solution doping said third optical fiber with a material from the group consisting of transition metals and rare earth elements;

providing first and second cylindrical ferrules;

fixedly disposing said first ferrule around said first optical fiber and a first portion of said third optical fiber, wherein an endface of said first optical fiber is in substantial optical contact with a first endface of said third optical fiber;

fixedly disposing said second ferrule around said second optical fiber and a second portion of said third optical fiber, wherein an endface of said second optical fiber is in substantial optical contact with a second endface of said third optical fiber;

providing a sleeve sized to accommodate said first and second ferrules; and inserting said first and second ferrules into the sleeve.

6. The method of claim 5, wherein said first and second ferrules are made of a material in the group consisting of alumina, zirconia, stainless steel, and ceramic.

7. A method of fabricating an optical attenuator, comprising the steps of:

providing first and second optical fibers, each fiber characterized by a core and a cladding coaxial with said core;

solution doping said second optical fiber with a material from the group consisting of transition metals and rare earth elements;

chemical etching a portion of the cladding of said second optical fiber; and fusion splicing an endface of said first optical fiber to an endface of said second optical fiber.

* * * * *